United States Patent [19]

Degner

[11] 3,993,563
[45] Nov. 23, 1976

[54] GAS INGESTION AND MIXING DEVICE
[75] Inventor: Vernon R. Degner, Citrus Heights, Calif.
[73] Assignee: Envirotech Corporation, Menlo Park, Calif.
[22] Filed: Apr. 28, 1975
[21] Appl. No.: 572,700

[52] U.S. Cl. .................... 210/221 M; 209/169; 261/79 A
[51] Int. Cl.² .......................................... B03D 1/00
[58] Field of Search ............. 209/169; 210/44, 219, 210/221 M; 261/93, 79 A

[56] References Cited
UNITED STATES PATENTS

| 2,075,344 | 3/1937 | Hawley ............................ 261/79 A |
| 2,732,909 | 1/1956 | Campbell ...................... 261/79 A X |
| 2,767,965 | 10/1956 | Daman ............................ 261/93 X |
| 2,875,897 | 3/1959 | Booth .................................. 209/169 |
| 3,248,860 | 5/1966 | Carlson ........................ 261/79 A X |
| 3,345,046 | 10/1967 | Versluys et al. .................. 261/79 A |
| 3,491,880 | 1/1970 | Reck .............................. 210/221 M |
| 3,647,069 | 3/1972 | Bailey ............................ 210/221 M |

Primary Examiner—Thomas G. Wyse
Assistant Examiner—Robert H. Spitzer
Attorney, Agent, or Firm—Robert E. Krebs; Thomas S. MacDonald

[57] ABSTRACT

An apparatus for ingesting and mixing gas into a liquid body includes a tank, a rotatable impeller fixed to a vertical drive shaft, and a vertically-extending conduit which surrounds the drive shaft and which extends to a location in the liquid above the impeller to serve as a channel of communication between a source of gas and the impeller. In the conduit, a vortex-turning baffle having an enlarged gas-flow aperture formed centrally therethrough is fixedly mounted above the impeller so that when a rotor-induced liquid vortex rises along the wall of the conduit, the vortex is turned downwardly by the baffle to aid in the ingestion of gas into the liquid.

3 Claims, 3 Drawing Figures

GAS INGESTION AND MIXING DEVICE

BACKGROUND OF THE INVENTION

The present invention generally relates to an improved device for ingesting and mixing gas into a liquid body to promote chemical or physical reactions therein.

Mechanical dispersed air flotation units are well known for ingesting gas into liquids and are extensively used, for example, in the mineral flotation art. Those devices, however, have been found inadequate to provide the increased gas ingestion rates and high-speed operation which are necessary to achieve sufficient contacting and mixing to promote some chemical and physical reactions.

According to the present invention, there is provided a gas-liquid contacting device which achieves high gas ingestion rates when operated at impeller speeds above the operative range of prior machines and/or with impellers larger than those usually employable. Various other advantages of the present invention may readily be ascertained by reference to the following detailed description, which is offered by way of example only and not in limitation of the invention, the scope of which is defined by the appended claims.

In the drawings incorporated into the following description:

FIG. 1 is an elevational view, partially cut away and in section, of a device according to the invention; and FIGS. 2 and 3 are detail views in section illustrating particular modifications of the device according to the invention.

DETAILED DESCRIPTION OF THE PREFERRED EMBODIMENT

Figure 1:
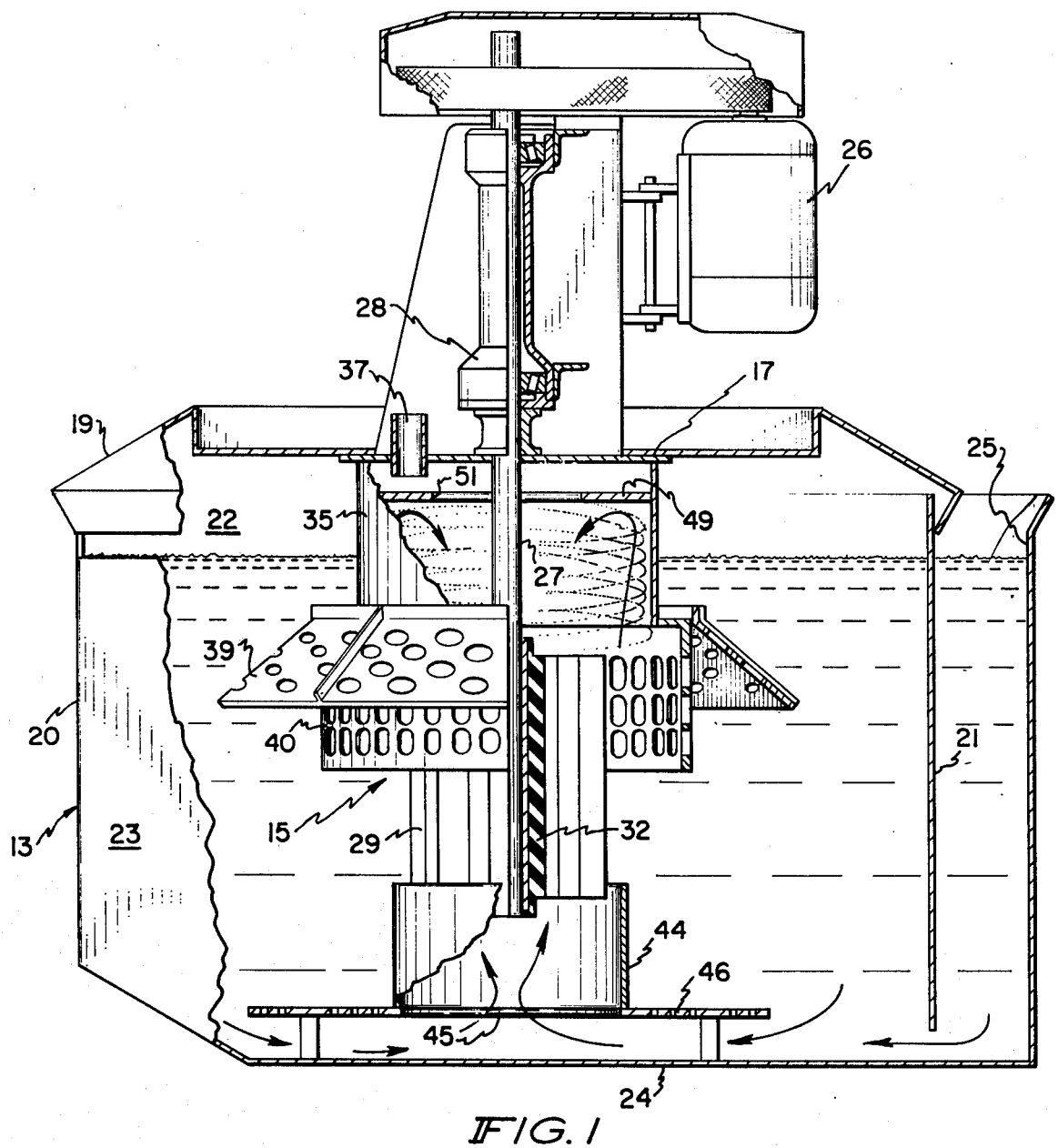

The gas-liquid contacting unit shown in FIG. 1 generally includes a liquid-holding tank 13 and a rotor-type mixing means 15 which is mounted centrally in the tank by a rigid stationary structure 17 for agitating the liquid in the tank. The illustrated tank 13 has a generally rectangular configuration and is defined by upstanding marginal sidewalls 20–23 and a bottom wall 24. Liquid to be mixed is introduced to the lower region of the tank, preferably via an appurtenant feed box 25 from which the influent liquid flows beneath the lower edge of the adjacent sidewall 21 into the tank 13 proper. At least one of the other sidewalls, say wall 23, may be constructed to serve as an overflow weir for removing froth and floating substances from the tank. In usual practice, the weir wall 23 is adjustable in height so that the liquid overflow can be selectively varied. Processed liquid is usually removed from the tank via a conventional underflow weir, not shown. Normally, but not necessarily, the cell is sealingly enclosed by a removable cover 19 to contain vapors and fumes.

The illustrated mixing means 15 includes a drive unit 26, such as an electric motor, supported on the mounting structure 17 and coupled to the upper end of a vertically-arranged rotatable drive shaft 27. In the illustrated embodiment, the drive shaft 27 is supportively journaled by a bearing assembly 28 and extends downwardly therefrom into the tank and has an impeller 29 fixed to its distal end at a predetermined distance below the liquid surface. The illustrated impeller includes a tubular hub 32 and a plurality of radially-extending vanes having long vertical outer edges. The vanes can be flexible and their vertical edges can be thickened somewhat to increase the mixing action which occurs as the impeller turns with the drive shaft.

A hollow cylindrical conduit or "standpipe" 35 is fixedly suspended from the structure 17 to concentrically surround the drive shaft 27 and to extend into the liquid to a location adjacent the impeller 29. The interior diameter of the conduit 35 substantially exceeds the diameter of the drive shaft and preferably, is 1.3 to 2.0 times greater than the diameter of the impeller. At its upper end, the conduit 35 is in communication with the atmosphere or with a source of gas via an inlet 37. (In the case of an enclosed tank, the inlet 37 could extend from the side of the conduit 35 into the freeboard space 22.) In the illustrated embodiment, a stator assemblage is fixed to the lower end of the conduit and includes a downwardly and outwardly flairing perforated hood 39 and a perforated cylindrical "disperser" member 40, both of which concentrically and spacedly surround at least the upper portion of the rotor 29. When the impeller rotates, a liquid vortex is generated in the conduit 35; the central core of the vortex is of reduced pressure and provides suction to draw gas downwardly through the conduit 35 for mixing with the liquid in the tank.

The illustrated gas-liquid contacting unit also includes an optional open-ended draft tube 44 which is mounted concentrically below the impeller on a perforated "false bottom" plate 46 that is stationarily spaced somewhat above and parallel the floor of the tank. The lower end of the draft tube 44 is in direct communication with the liquid in the tank below the false bottom plate 46. When the unit is in operation, liquid is drawn upwardly through the draft tube and thence into the impeller, and then is driven radially outward by the force of the impeller rotation.

As described to this point, the gas-liquid contacting unit is structurally quite similar to prior art devices which are shown, for example, in U.S. Pat. Nos. 3,491,880, 3,647,069 and 2,875,897. Although those prior art devices are normally used for practicing dispersed air flotation they are, in fact, unsatisfactory for gas-liquid contacting applications where rotors must be driven at significantly higher speeds than normal in order to achieve greater gas-liquid mixing action and increased gas ingestion. One problem that arises when any one of these prior art devices is operated at high rotor speeds is that the liquid vortex generated within the conduit 35 stabilizes at such a high location on the standpipe wall that the gas flow to the rotor is choked off. The same problem arises when the prior art devices are equipped with larger or high-capacity impellers.

An important feature of the illustrated device is that a vortex-turning baffle is fixed within the standpipe 35 below the gas inlet 37. In the embodiment illustrated in FIG. 1, the baffle 49 is a circular plate which has a flat undersurface and which also has a relatively large aperture 51 formed centrally therethrough to provide communication between the gas inlet 37 and the impeller 29. In practice, any liquid vortex which reaches the baffle 49 is thence turned or forced downwardly as indicated by the arrows in the drawing. It has been found that the resultant, downwardly flowing vortex actually significantly aids in the ingestion of gas into the impeller 29.

The following table of test results shows the dramatic and surprising improvement in gas ingestion rates (measured in standard cubic feet per hour, SCFH) when the vortex-turning baffle is utilized in a machine as compared to the same machine operating without a baffle. As the table shows, gas ingestion rates for a machine equipped with a vortex-turning baffle exceed the maximum ingestion rates for a machine without a baffle by between fifty and three hundred percent.

WITHOUT VORTEX-TURNING BAFFLE

| Rotor Speed (rpm) | 400 | 500 | 600 | 630 | 650 | 700 | 900 | 1000 | 1250 | 1350 |
| --- | --- | --- | --- | --- | --- | --- | --- | --- | --- | --- |
| Power (hp) | 0.036 | 0.063 | 0.089 | 0.134 | 0.147 | | | | | |
| Air Flow (scf/h) | 20 | 65 | 100 | 30 | 15 | Minimal Gas Ingestion | | | | |
| Rotor Cavity Vacuum (in. H₂O) | 0.7 | 0.9 | 1.7 | 0.5 | 0.35 (Fluctuates) | | | | | |

WITH VORTEX-TURNING BAFFLE

| Rotor Speed (rpm) | 400 | 500 | 600 | 630 | 650 | 700 | 900 | 1000 | 1250 | 1350 |
| --- | --- | --- | --- | --- | --- | --- | --- | --- | --- | --- |
| Power (hp) | | | | | | 0.135 | 0.234 | 0.270 | 0.452 | 0.540 |
| Air Flow (scf/h) | No Data Taken | | | | | 150 | 250 | 285 | 350 | 375 |
| Rotor Cavity Vacuum (in. H₂O) | | | | | | 2.4 | 3.0 | 3.5 | 4.2 | 4.5 |

For a machine operating without a vortex-turning baffle, the table shows that the gas ingestion rates decrease markedly at impeller speeds (revolutions per minute) beyond an optimum value of about six hundred rpm. The same is true of the pressure differential at the vortex core (designated as "rotor cavity" in the table and measured in inches of water). In fact, there is virtually no gas ingested at impeller speeds above nine hundred rpm in a machine not equipped with a vortex-turning baffle. With respect to a machine equipped with a baffle, however, it should be observed that the rotor cavity vacuum continues to increase with impeller speed at rotational speeds well above seven hundred rpm. Lower speed results were not measured for the machine equipped with a baffle because only the higher speeds were of interest with respect to the mixing action.) In summary, the vortex-turning baffle not only allows higher speed operation but, in fact, significantly increases the effective vortex core vacuum and gas ingestion rates.

Figure 2:
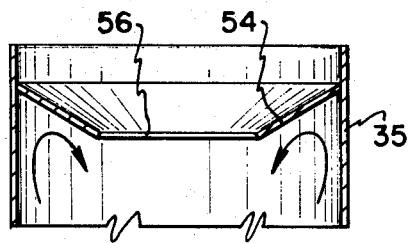
Figure 3:
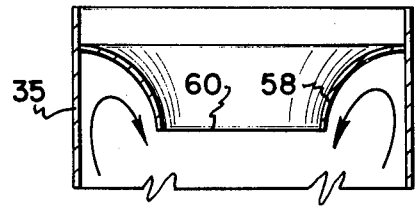

FIGS. 2 and 3 illustrated two alternative embodiments of vortex-turning baffles which can be utilized with the previously described apparatus. In FIG. 2, the baffle 54 has an inverted frustoconical configuration (which is to say that the undersurface of the baffle slopes downwardly and inwardly with respect to the standpipe 35) and there is a central aperture 56 formed axially through the baffle for gaseous flow. In FIG. 3, the vortex-turning baffle 58 has a smoothly curved undersurface that also slopes downwardly and inwardly of the standpipe 35; the baffle 58 in this configuration also includes a central aperture 60 which provides a flowpath for gas to pass downwardly through the standpipe 35 to the impeller 29. To achieve increased gas ingestion it has been found quite important that the undersurfaces of the baffles in all the configurations are smooth and have no protruding portions which could destroy the liquid vortex. A sharp protruding shoulder, for example, on the undersurface of the baffle can create high turbulence and fluid shear which destroys a liquid vortex, rather than turning it, and results in lowered gas ingestion rates and higher power losses.

I claim:

1. In an apparatus for ingesting and mixing gas into a liquid body to promote chemical or physical reactions therein, which apparatus includes a tank for holding a body of liquid, an impeller fixed to a vertically-extending drive shaft for rotation in submergence in the liquid body to cause a flow of liquid radially outward from the impeller and a vertically-extending conduit whose diameter generally exceeds the diameter of the impeller and which is arranged concentrically about the drive shaft and extends to a location in the liquid body adjacent to the impeller to define a channel of communication between a source of gas and the impeller and which further is arranged such that a liquid vortex rises along the wall of the conduit when the rotor is turned at high speeds; the improvement comprising:
   a. a baffle fixedly mounted within the conduit above the impeller to turn the liquid vortex downwardly whenever the same rises to a predetermined elevation in the conduit; and
   b. said baffle including a member having an enlarged aperture formed centrally therethrough to provide a flow path for gas to pass downwardly through said conduit to said rotor and having a smooth flat undersurface which is horizontally arranged to meet a rising liquid vortex.

2. In an apparatus for ingesting and mixing gas into a liquid body to promote chemical or physical reactions therein, which apparatus includes a tank for holding a body of liquid, an impeller fixed to a vertically-extending drive shaft for rotation in submergence in the liquid body to cause a flow of liquid radially outward from the impeller and a vertically-extending conduit whose diameter generally exceeds the diameter of the impeller and which is arranged concentrically about the drive shaft and extends to a location in the liquid body adjacent to the impeller to define a channel of communication between a source of gas and the impeller and which further is arranged such that a liquid vortex rises along the wall of the conduit when the rotor is turned at high speeds; the improvement comprising:
   a. a baffle fixedly mounted within the conduit above the impeller to turn the liquid vortex downwardly whenever the same rises to a predetermined elevation in the conduit; and
   b. said baffle including a member having a frustoconical shape with sidewalls sloping downwardly and inwardly relative to said conduit and having an enlarged aperture formed axially therethrough to provide a flow path for gas to pass downwardly through said conduit to said rotor.

3. In an apparatus for ingesting and mixing gas into a liquid body to promote chemical or physical reactions therein, which apparatus includes a tank for holding a body of liquid, an impeller fixed to a vertically-extending drive shaft for rotation in submergence in the liquid body to cause a flow of liquid radially outwardly from the impeller and a vertically-extending conduit whose diameter generally exceeds the diameter of the impeller and which is arranged concentrically about the drive shaft and extends to a location in the liquid body adjacent to the impeller to define a channel of communication between a source of gas and the impeller and which further is arranged such that a liquid vortex rises along the wall of the conduit when the rotor is turned at high speeds; the improvement comprising:

a. a baffle fixedly mounted within the conduit above the impeller to turn the liquid vortex downwardly whenever the same rises to a predetermined elevation in the conduit; and b. said baffle including a member whose undersurface slopes smoothly downwardly and inwardly with respect to said conduit and which has an enlarged aperture formed centrally therethrough to provide a flow path for gas to pass downwardly through said conduit to said rotor.

* * * * *